(12) United States Patent
Li et al.

(10) Patent No.: US 9,138,684 B2
(45) Date of Patent: Sep. 22, 2015

(54) FILTER FOR REMOVAL OF HEAVY METALS

(71) Applicant: MILLIKEN & COMPANY, Spartanburg, SC (US)

(72) Inventors: Shulong Li, Spartanburg, SC (US); David E. Wenstrup, Greer, SC (US); Christopher A. DeSoiza, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 9 days.

(21) Appl. No.: 14/109,086

(22) Filed: Dec. 17, 2013

(65) Prior Publication Data

US 2014/0186243 A1    Jul. 3, 2014

Related U.S. Application Data

(60) Provisional application No. 61/748,570, filed on Jan. 3, 2013.

(51) Int. Cl.
| | |
|---|---|
| *B01J 20/26* | (2006.01) |
| *B01D 53/64* | (2006.01) |
| *B01D 53/02* | (2006.01) |
| *B01J 20/28* | (2006.01) |
| *B01D 53/82* | (2006.01) |

(52) U.S. Cl.
CPC ............... *B01D 53/64* (2013.01); *B01D 53/02* (2013.01); *B01D 53/82* (2013.01); *B01J 20/2803* (2013.01); *B01J 20/28026* (2013.01); *B01D 2251/108* (2013.01); *B01D 2253/102* (2013.01); *B01D 2253/25* (2013.01); *B01D 2257/602* (2013.01); *B01D 2258/0283* (2013.01)

(58) Field of Classification Search
CPC ...................................................... B01J 20/26
USPC ......................................................... 502/402
See application file for complete search history.

(56) References Cited

U.S. PATENT DOCUMENTS

| | | | |
|---|---|---|---|
| 3,953,566 A | 4/1976 | Gore | 264/288 |
| 4,110,392 A | 8/1978 | Yamazaki | 264/127 |
| 4,187,390 A | 2/1980 | Gore | 174/102 R |
| 7,494,632 B1 | 2/2009 | Klunder | 423/210 |
| 2004/0074391 A1 | 4/2004 | Durante et al. | 95/285 |
| 2011/0076210 A1 | 3/2011 | Pollack et al. | 423/210 |
| 2012/0115716 A1 | 5/2012 | Johnson et al. | 502/401 |
| 2013/0195740 A1 | 8/2013 | Li et al. | 423/210 |
| 2014/0014876 A1 | 1/2014 | Li et al. | 252/184 |

FOREIGN PATENT DOCUMENTS

| | | |
|---|---|---|
| WO | WO 2012/009521 | 1/2012 |

OTHER PUBLICATIONS

Patent Cooperation Treaty PCT International Search Report. Date of Mailing, Apr. 28, 2014. International Application No. PCT/US2013/078447. International Filing Date, Dec. 31, 2013.

*Primary Examiner* — Edward Johnson
(74) *Attorney, Agent, or Firm* — Cheryl J. Brickey

(57) ABSTRACT

A filter contains a textile having on at least one side a plurality of treated activated carbon particles. The treated activated carbon particles contain a plurality of activated carbon particles, a hydrophobic agent, a mercury oxidation facilitation agent, and optionally a binder.

11 Claims, 1 Drawing Sheet

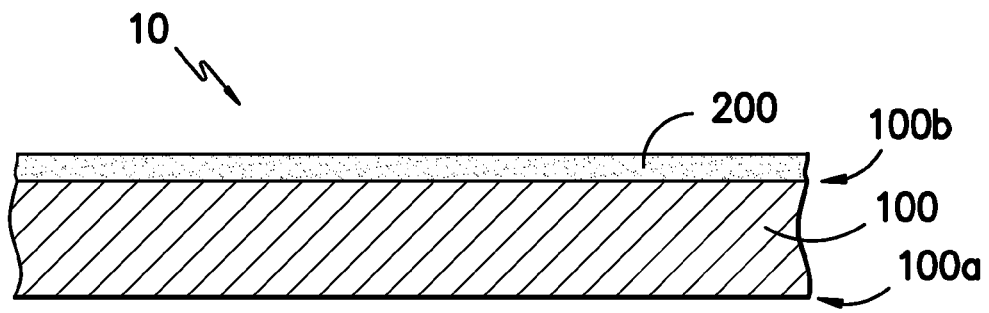
FIG. -1-
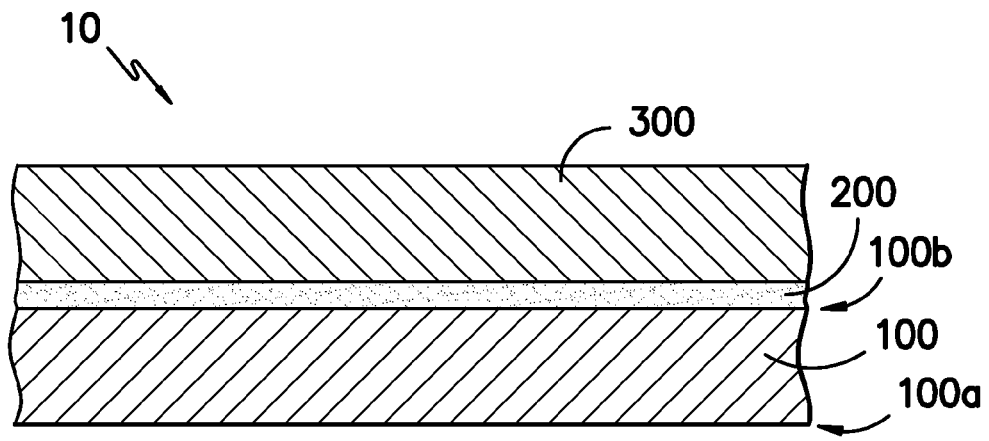
FIG. -2-
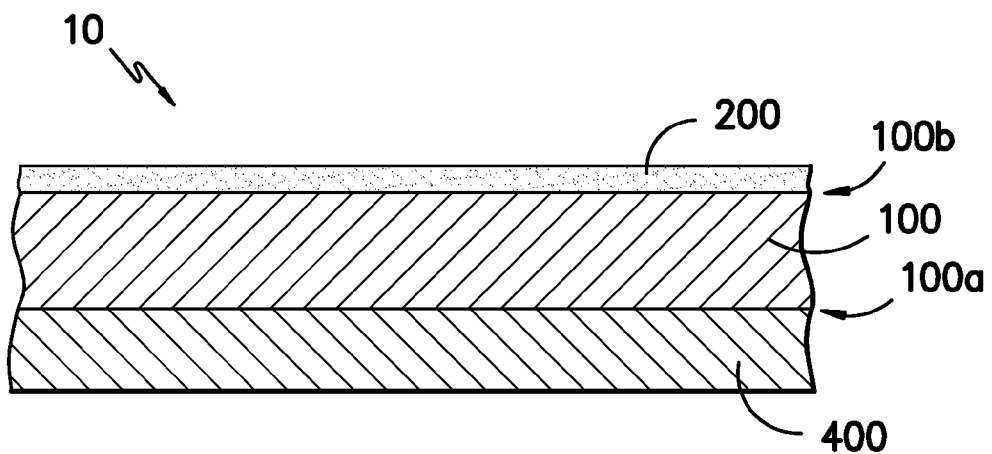
FIG. -3-

FILTER FOR REMOVAL OF HEAVY METALS

RELATED APPLICATIONS

This application claims priority to provisional application 61/748,570 filed on Jan. 3, 3013 and is herein incorporated by reference in its entirety.

TECHNICAL FIELD

This application relates to activated carbon articles and compositions comprising the same. The articles and compositions described herein are believed to be suitable for use as chemical adsorbents in industrial processes. The application also relates to a process for producing activated carbon particles and compositions comprising such particles.

BACKGROUND

Coal-fired power generation plants, municipal waste incinerators, and oil refinery plants generate huge amounts of flue gases that contain substantial varieties and quantities of environmental pollutants, such as sulfur oxides ($SO_2$, and $SO_3$), nitrogen oxides (NO, $NO_2$), and heavy metals such as mercury (Hg) vapor.

The destructive effects of various coal-burning pollutants on human health and on the ecosystem were recognized a long time ago. For example, $SO_x$ and $NO_x$ have been linked to the outbreak of respiratory diseases in the affected areas. They also form acid rains, which damage forests, fisheries, and architectures. As for Hg, it is a potent toxin to the nervous system. Exposure to mercury can affect the brain, spinal cord, and other vital organs. It is particularly dangerous to developing fetuses and young children.

Mercury and other pollutants may be captured and removed from a flue gas stream by injection of a sorbent into the exhaust stream with subsequent collection in a particulate matter control device such as an electrostatic precipitator or a fabric filter. Adsorptive capture of Hg from flue gas is a complex process that involves many variables. These variables include the temperature and composition of the flue gas, the concentration and speciation of Hg in the exhaust stream, resonance time, and the physical and chemical characteristics of the sorbent.

It is well-known that activated carbon is particularly effective as a chemical adsorbent. Given this property, activated carbon is used as an adsorbent in a variety of industrial processes. For example, the EPA and various other entities have studied and advocated the use of activated carbon in the treatment of flue gases produced during the combustion of coal, such as the flue gases produced at coal fired power plants. This process, which is known as "activated carbon injection," has been touted as a potentially effective means for reducing the mercury emissions that typically accompany the combustion of coal. One potential drawback to the use of this system is the tendency to increase the amount of fly ash waste produced.

Despite the touted benefits of activated carbon injection, the efficacy of the process is believed to be limited by some of the inherent characteristics of the activated carbon. For example, it is believed that the porous nature of the activated carbon, which is the very property that makes the activated carbon useful in the process, allows the product to absorb large amounts of the water vapor and/or unwanted condensation present in both the ambient atmosphere (such as water vapor absorbed during storage of the activated carbon) and the flue gas environment. Once this water vapor and/or unwanted condensation has been absorbed, the effective pore volume of the activated carbon (that is, the pore volume that is available for adsorption of mercury) can be dramatically reduced. And this reduction in effective pore volume means that each kilogram of activated carbon used in the process is less effective than it would otherwise be if the activated carbon had not absorbed the water vapor. This reduction in efficacy means the process is overall less efficient. Though powdered activated carbon (PAC) is somewhat effective to capture oxidized mercury species such as $Hg^{2+}$, PAC is not as effective for elemental mercury, which constitutes a major Hg species in flue gas, especially for subbituminous coals and lignite. Therefore, there is a need to provide a filter system that can abate the heavy metals such as mercury for a low cost.

BRIEF SUMMARY OF THE INVENTION

The present invention provides a filter containing a textile having on at least one side a plurality of treated activated carbon particles securely attached to the textile surface or incorporated inside the textile structure. The treated activated carbon particles contain a plurality of activated carbon particles, a hydrophobic agent, a mercury oxidation facilitation agent, and optionally a binder. The process for forming the filter and using the filter to remove heavy metals from a flue gas are also disclosed.

BRIEF DESCRIPTION OF THE FIGURES

FIG. 1 illustrates schematically a cross-section of an exemplary filter having a first textile and treated activated carbon particles.

FIG. 2 illustrates schematically a cross-section of an exemplary filter having a first textile, a membrane, and treated activated carbon particles.

FIG. 3 illustrates schematically a cross-section of an exemplary filter having two textiles and treated activated carbon particles.

DETAILED DESCRIPTION OF THE INVENTION

Referring now to FIG. 1, there is shown an embodiment of the filter 10 having a first textile 100 and the treated activated carbon particles 200. The first textile has a first side 100*a* and a second side 100*b*. Typically the filter is oriented so that the flow of material to be filtered enters the first textile 100 on the first side 100*a* and exits the second side 100*b*. The air then passes through the treated activated carbon particles 200 on the second side 100*b* of the first textile 100. The first side 100*a* may include a porous membrane material, such as expanded PTFE film or a nanofiber web layer. The first side 100*a* may also be a textile surface configured to filter out fine particulates, such as a singed surface with a tighter fiber packing or small fabric porosity. Very little, if any, dust or particulate particles in the flue gas would pass through the filter textile 100, thus effectively preventing dust buildup on the surface of the treated activated carbon particles 200.

The filter 10, in one embodiment, has an air permeability of between about 1 and 5 cfm if a membrane is provided on at least one of the surfaces, and between about 5 cfm and 100 cfm, 10 cfm and 50 cfm, or 10 cfm and 40 cfm if no membrane is included in the filter. The filter 10 preferably has a thickness of between about 0.2 and 10 mm and is preferably flexible enough to allow the filter to be formed into various 3 dimensional shapes for different end uses. In one use the filter is used in elevated temperature environments such as in a bag house for filtering flue gas from a coal fired plant or smelting process to remove heavy metals such as mercury. The filter, for example, may be formed into bag-like shapes, formed into cartridges, or used in a flat state.

The first textile 100 may be any textile suitable for the desired end use. The first textile may be a woven, non-woven, or knit textile. In one embodiment, the first textile 100 is a woven textile. The weave may be, for example, plain, satin, twill, basket-weave, poplin, jacquard, and crepe weave textiles. Certain woven textiles, such as glass fiber or PPS fiber based woven textiles, alone or in combination with a non-woven textile, can provide higher mechanical strength.

In another embodiment, the first textile 100 is a knit textile, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face. The loop pile of a knit textile may be flexible and move enough that the action may aid in releasing the dust cake from the filter. In another embodiment, the first textile is a multi-axial, such as a tri-axial textile (knit, woven, or non-woven). In another embodiment, the first textile is a bias textile. In another embodiment, the first textile is a unidirectional textile and may have overlapping yarns or may have gaps between the yarns.

In another embodiment, the first textile 100 is a non-woven textile. The term "non-woven" refers to structures incorporating a mass of yarns or fibers that are entangled and/or heat fused so as to provide a coordinated structure with a degree of internal coherency. Non-woven textiles may be formed from many processes such as for example, meltspun processes, hydroentangeling processes, mechanically entangled processes, stitch-bonding processes and the like. Non-woven textiles are typically less expensive to manufacture and can provide the selected pore structures useful for a filter medium. The randomness of the fiber orientation allows one to achieve a very uniform mean pore size and the amount of mass in the nonwoven can be built up until you achieve a wide range of desired mean pore sizes.

The textile has varying properties related to its desired end use. In one embodiment, the textile has an air permeability of between about 1 and 200 cfm (cubic feet per minute). This air permeability range has been shown to suitable produce filters for flue gasses coming from coal fired power plants and other air filtration needs. More preferably, the first textile 100 has an air permeability of between about 25 and 50 cfm measured at 125 Pa according to ASTM D737-04 (2008) Standard Test Method for Air Permeability of Textile Fabrics. In another embodiment, the first textile has a mullen burst of greater than 500 PSI. In one embodiment, the first textile 100 is acid resistant. The textile used in the filter are selected from materials that can maintain sufficient mechanical properties in the presence of acids and acidic gas at elevated temperatures (120° C., up to 400° C.).

The first textile 100 contains yarns which may be any suitable fiber. "Fiber", in this application, as used herein includes a monofilament elongated body, a multifilament elongated body, ribbon, strip, yarn, tape, and the like. The term fiber, in this application is defined to include a yarn. The first textile 100 may contain one type of yarn or a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

The fibers may be made of any suitable material. Because the filter may be used in flue gas environments, the fibers preferably have a melting temperature and decomposition temperature greater than the temperature of the gas that the filter 10 is filtering. Preferably, the fibers have a melting temperature greater than 250° F. More preferably, the fibers have a melting temperature greater than 400° F. The first textile 100 may include (but is not limited to) glass, aramid, polyphenylene sulfide, polyester, polyimide, polytetrafluoro-ethylene, ceramic materials, sulfo-aramid, polyoxadiazoles, polyetheretherketone, polyamide-imide, polypyridobisimi-dazoles, and mixtures and co-polymers thereof. In one embodiment, it is preferred to use polyphenylene sulfide (PPS) fibers because of its acid resistance and high temperature stability. In another embodiment, the fiber may be polyester fiber. A polyester fiber filter including the activated carbon-containing composition may be used to effectively remove mercury pollutants and be replaced at a relative shorter life cycle at a reasonably low cost. In another embodiment, the activated carbon-containing composition also provides melting and burn-through protection of the polyester fiber.

Referring back to FIG. 1, there are shown treated activated carbon particles 200 on the second side 100b of the first textile 100. While the treated activated carbon particles 200 are shown on the second side 100b of the first textile 100, they may be present on both sides (100a, 100b) of the first textile or only on the first side 100a of the first textile 100. The treated activated carbon particles may reside only on the surface of the first textile 100, may penetrate a certain depth into the first textile 100, or may penetrate the first textile 100 completely.

In one embodiment, the treated activated carbon particles are applied in an amount of between 10 and 50% by weight of the first textile. In another embodiment, the coating weight of the treated activated carbon particles is between about 50 and 300 g/m$^2$, more preferably between about 70 and 160 g/m$^2$.

In a first embodiment, the invention provides a filter 10 having a layer of treated activated carbon particles 200 comprising an activated carbon core. As utilized herein, the term "activated carbon" is used to refer to an amorphous form of carbon that has been produced and/or processed so that it possesses a highly porous structure and correspondingly high surface area. For example, in a preferred embodiment, the activated carbon has a BET surface area of about 300 m$^2$/g or more, 500 m$^2$/g or more, about 750 m$^2$/g or more, about 1,000 m$^2$/g or more, about 1,250 m$^2$/g or more, or about 1,500 m$^2$/g or more. In another embodiment, the treated activated carbon particles contains an adsorbent agent which preferably does not melt or degrade at the flue gas temperature (about 400° F.) and is stable under the flue gas conditions (temperature, pressure, gas components, residence time, etc). A listing of possible adsorbent agents includes, but is not limited to activated carbon, molecular sieve, zeolite, and mixtures thereof.

The activated carbon core can be provided in any suitable form. For example, the activated carbon core can be a powder, a fine granule (e.g., a granule having an average diameter of about 0.15 mm to about 0.25 mm), a granule (e.g., a granule having an average diameter of about 0.3 mm to about 0.85 mm), a fiber, a fabric, a nonwoven felt, a porous honeycomb structure, an extruded particle, or a bead. The activated carbon core can be of any suitable size. In a preferred embodiment, the activated carbon core is a powdered activated carbon having a particle size (e.g., an average particle size) of about 1 μm to about 500 μm, about 10 μm to about 100 μm, or about 10 μm to about 50 μm.

The article further comprises a hydrophobic agent. The hydrophobic agent is included in the article in order to impart a desired degree of hydrophobicity to the activated carbon. By rendering the activated carbon hydrophobic, the activated carbon absorbs less water vapor and/or condensation and, therefore, the pore volume of the activated carbon that is available for adsorption of mercury is retained and/or maximized. Furthermore, rendering activated carbon particles hydrophobic can improve the flow characteristics of the particles because activated carbon particles that have absorbed moisture are more susceptible to agglomeration. Preferably, at least a portion of the hydrophobic agent is disposed on at least a portion the outer surface of the activated carbon core. The hydrophobic agent can be any suitable agent that renders the activated carbon core more hydrophobic than the virgin (i.e., untreated) activated carbon. In a preferred embodiment, the hydrophobic agent is selected from the group consisting of fluorocarbon polymers, silicones, alkylsilanes, waxes, and mixtures thereof. The fluorocarbon polymers suitable for use as the hydrophobic agent can be any suitable fluorocarbon polymer (e.g., a film-forming fluorocarbon homopolymer or copolymer) that is capable of forming a film or coating on the surface of the activated carbon core. In a preferred embodiment, the hydrophobic agent is a film-forming fluorocarbon polymer comprising repeating units derived from a monomer selected from the group consisting of fluorinated acrylate monomers, fluorinated acrylamide monomers, fluorinated ethylenic monomers, fluorinated polyols, fluorinated polyisocyanates, and mixtures thereof. Suitable fluorocarbon polymers can also comprise repeating units derived from other fluorine containing or non-fluorinated comonomers, such as methacrylates, acrylates, vinyl chloride, vinylidene chloride, vinyl fluoride, vinylidene fluoride, (meth)acrylic acid, (meth)acrylamide, acrylonitrile, silicone acrylate, and the like. Suitable fluorocarbon polymers can also be a product obtained from reacting a fluorocarbon polymer with a silicone, an isocyanate, an epoxy, a formaldehyde-amino resin or other organic compounds. The silicones suitable for use as the hydrophobic agent can be any suitable silicone compound. Suitable silicone compounds include, but are not limited to, polydimethylsiloxanes, polyhydromethylsiloxanes, aminosilicones, polymethylphenylsiloxanes, siloxane copolymers, and mixtures thereof. Suitable siloxane copolymers include, but are not limited to, copolymers comprising two or more monomer units selected from the group consisting of dimethylsiloxane, methylhydrosiloxane, methylphenylsiloxane, diphenylsiloxane, amino-substituted siloxane, and epoxide-substituted siloxane. The alkylsilanes suitable for use as the hydrophobic agent can be any suitable alkylsilane compound. Suitable alkylsilanes include, but are not limited to, those compounds conforming to the formula $R_1Si(OR_2)_3$, where $R_1$ is an alkyl group or a fluoroalkyl group containing 4 or more carbon atoms and $R_2$ is selected from the group consisting of methyl, ethyl, isopropyl, and butyl. Suitable examples of $R_1$ include, but are not limited to, tert-butyl, octyl, lauryl, hexyl, pentyl, heptyl, and perfluorinated alkyl groups comprising 4 or more carbon atoms. The waxes suitable for use as the hydrophobic agent can be any suitable wax, including natural waxes, synthetic waxes, and mixtures thereof. Suitable natural waxes include, but are not limited to esters of fatty acids, esters of long chain alcohols, and mixtures thereof. Suitable synthetic waxes include, but are not limited to, hydrocarbon waxes (e.g., paraffin), polyolefin waxes (e.g., polyethylene wax), alkylated melamines, and mixtures thereof.

The hydrophobic agent can be present in the article in any suitable amount. The desired amount of the hydrophobic agent may depend upon several factors, such as the type of hydrophobic agent, the hydrophobicity of the hydrophobic agent, and the desired degree of hydrophobicity to be imparted to the activated carbon and article. In a preferred embodiment, the hydrophobic agent can be present in an amount of about 0.1% or more, about 0.2% or more, about 0.3% or more, about 0.4% or more, or about 0.5% or more based on the weight of the activated carbon core. In a preferred embodiment, the hydrophobic agent can be present in an amount of about 10% or less, about 9% or less, about 8% or less, about 7% or less, about 6% or less, about 5% or less, about 4% or less, about 3% or less, or about 2.5% or less based on the weight of the activated carbon core. In certain preferred embodiments, the hydrophobic agent can be present in an amount of about 0.1% to about 5% (e.g., about 0.1% to about 2.5%), about 0.2% to about 5% (e.g., about 0.2% to about 2.5%), about 0.3% to about 5%, or about 0.3% to about 2.5% based on the weight of the activated carbon core.

The article further comprises a mercury oxidation facilitation agent. The mercury oxidation facilitation agent is present in the article in order to effect or promote the oxidation of elemental mercury contained in the flue gases. Generally, it is believed that oxidized mercury is more easily sequestered than elemental mercury. Preferably, at least a portion of the mercury oxidation facilitation agent is disposed on at least a portion of the outer surface of the activated carbon core. As utilized herein, the term "mercury oxidation facilitation agent" refers to an agent that (1) is capable of oxidizing elemental mercury contained in fossil fuel (e.g., coal) combustion gases at a temperature of from about 120° C. (250° F.) to about 230° C. (450° F.) or (2) interacts with other species present in fossil fuel (e.g., coal) combustion gases at a temperature of from about 120° C. (250° F.) to about 230° C. (450° F.) to result in the oxidation of elemental mercury contained in the combustion gases. Thus, suitable mercury oxidation facilitation agents include those compounds that can themselves oxidize the elemental mercury (i.e., the agent or a component in the agent has a reduction potential greater than the reduction potential of elemental mercury in the combustion gas environment). Suitable mercury oxidation facilitation agents also include those compounds that themselves are incapable of oxidizing elemental mercury (that is, neither the agent nor a component in the agent has a reduction potential greater than the reduction potential of elemental mercury in the combustion gas environment) but are known to interact with other species present in the combustion gases to result in the oxidation of elemental mercury (oftentimes by mechanisms that are not well understood due to the complexities of the combustion gas environment). Further, these different types of mercury oxidation facilitation agents can be used together in any suitable combination.

In a preferred embodiment, the mercury oxidation facilitation agent is selected from the group consisting of bromide salts, chloride salts, iodide salts, permanganate salts, perchlorate salts, perbromate salts, hypochlorite salts, copper(II) salts, iron(III) salts, cerium (IV) oxide, copper(II) oxide, iron (III) oxide, manganese(IV) oxide, vanadium(V) oxide, elemental halogen species (e.g., bromine and iodine), and mixtures thereof. In another preferred embodiment, the mercury oxidation facilitation agent is selected from the group consisting of ammonium bromide, magnesium bromide, sodium bromide, elemental halogen species, and mixtures thereof. In another preferred embodiment, the mercury oxidation facilitation agent is selected from the group consisting of chlorinated aliphatic compounds, brominated aliphatic compounds, and mixtures thereof. These different types of mercury oxidation facilitation agents can be used alone or in any suitable combination. For example, one or more of a bromide salt, chloride salt, iodide salt, permanganate salt, perchlorate salt, perbromate salt, hypochlorite salt, copper(II) salt, iron(III) salt, cerium (IV) oxide, copper(II) oxide, iron (III) oxide, manganese(IV) oxide, elemental halogen species, and vanadium(V) oxide can be used in combination with one or more of a chlorinated aliphatic compound or brominated aliphatic compound.

In another embodiment, the mercury oxidation facilitation agent may contain inorganic mercury oxidation facilitation agents, organic mercury oxidation facilitation agents, or a mixture of both. In one embodiment, the organic mercury oxidation facilitation agent may be, but is not limited to, polyvinyl chloride, polyvinylidene chloride, polyvinyl bromide, polydibromostyrene, copolymers comprising vinyl chloride, vinylidene chloride, vinyl bromide, or dibromostyrene, halogenated polyolefins, halogenated epoxy resins, polychloroprene, chlorosulfonated polyolefins, polychloromethylstyrene, and mixtures thereof. Preferably, the organic mercury oxidation facilitation agent is polyvinyl chloride, polyvinylene chloride, or a copolymer comprising vinylchloride and/or vinylidene chloride monomers. Preferably, the organic mercury oxidation facilitation agent is a polymer. Although the Applicant do not wish to be bound by or to any particular theory, it is believed that the organic mercury oxidation facilitation agent slowly produces a halogen containing species, such as hydrogen halide, over a long periods of time, thus contributing to the long lasting mercury removing and mercury oxidation performance on the filter. It is also believed that the intimate contact between the halogen producing agent and the adsorbent allows synergistic combination of mercury pollutant in the gas stream and the halogen species generated to combine on the adsorbent site for efficient oxidation reaction and more effective adsorption. It is also speculated that the adsorbent may adsorb the hydrogen halide or other halogen species and catalyze the oxidation of elemental mercury adsorbed from the gas stream. Other organic mercury oxidation facilitation agent conceived include aliphatic and aromatic halogen containing compounds such as halogenated wax, hexabromocyclododecane, tetrabromophthalates, brominated phenols, brominated bisphenols, quaternary ammonium halides, and the like.

The mercury oxidation facilitation agent can be present in any suitable amount, preferably the amount of agent that will be sufficient to match the life expectancy of the filter itself. The suitable amount of the mercury oxidation facilitation agent may depend upon several factors, such as the type of mercury oxidation facilitation agent used, the activity of the particular mercury oxidation facilitation agent used, and the amount of elemental mercury to be oxidized. In a preferred embodiment, the mercury oxidation facilitation agent is present in an amount of about 0.1% or more, about 0.5% or more, 1% or more, about 1.5% or more, or about 2% or more based on the weight of the activated carbon core. In a preferred embodiment, the mercury oxidation facilitation agent is present in an amount of about 20% or less, about 15% or less, about 10% or less, about 9% or less, about 8% or less, about 7% or less, about 6% or less, or about 5% or less based on the weight of the activated carbon core. In certain preferred embodiments, the mercury oxidation facilitation agent is present in an amount of about 0.1% to about 20%, about 0.5% to about 15%, about 1% to about 10%, or about 1.5% to about 10% (e.g., about 1.5% to about 5%) based on the weight of the activated carbon core.

In one embodiment, the treated activated carbon particles may additionally contain a binder. This binder serves to better adhere the treated activated carbon particles to the textile. It may also be chosen such that it helps regulate the rate of release of the mercury oxidation agent. In one embodiment, the hydrophobic agent also serves as the binder and a separate binder may or may not be present. The binder may be but is not limited to acrylic polymers, silicone polymer (polydimethylsiloxane, polymethylphenyloxane, and polydiphenyloxane), polyester, polyurethane, PTFE, polyolefin, organo-modified silicate, and mixtures thereof. The binder may be present at about 1% to about 500%, about 10% to about 200%, 50% to about 200% based on the weight of the activated carbon.

FIG. 2 illustrates another embodiment of the invention where the filter contains a second textile 300 on the treated activated carbon particles 200 (on the side of the chemistry opposite the first textile 100). While the second textile 300 is shown on the chemistry 200, the second textile 300 may be placed in any suitable location in the filter including on the first side 100a of the first textile 100, on the second side 100b of the first textile 100 between the textile 100 and the chemistry 200, or on the chemistry 200.

The second textile 300 may be formed from any of the materials and have any of the same properties listed as being for the first textile 100. In another embodiment, the second textile 300 may be formed from different materials and have different properties than the first textile 100. In one embodiment, the pore size of the first textile 100 is smaller than the pore size of the second textile 300. In another embodiment, the pore size of the first textile 100 is larger than the pore size of the second textile 300. The second textile 300 may be a regular filter fabric not securely attached to textile 100 structure. When the activated carbon particles reaches its adsorption capacity before the end of life of the second textile 300, the textile 100 structure can be readily separated from the rest of the structure and replaced individually. The textile 100 structure can also be used as an add-on layer to a conventional filter material such as the second textile 300.

In one embodiment, the second textile 300 is an activated carbon textile. The activated carbon textile as the second textile may have the organic halogen producing agent on it. This carbon textile may be used as part of the treated activated carbon particles instead of the activated carbon or in addition to it. The carbon textile may include woven, non-woven, or knitted carbon textile made from any carbon precursors, such as regenerated cellulosic fibers, phenolic fibers, and acrylic fibers. The carbon textile may be impregnated or coated with a composition comprising the halogen producing agent described above. The carbon textile with or without the halogen producing agent may be combined with the other layers shown in FIG. 3 by lamination, needling, stitching or sewing. The carbon textile is preferably sandwiched between two layers of porous materials to protect against abrasions due to the relative weak mechanical strength of the carbon textile layer.

FIG. 3 illustrates an additional embodiment of the filter where the filter 10 has a membrane 400 on the first side 100a of the first textile 100. The membrane 400 is placed on the first side 100a such that the flue gases pass through the membrane 400 before the first textile 100 and treated activated carbon particles 200.

For many applications, such as gas filtration, it is desirable to employ porous membranes in conjunction with the first (and optionally second) textile layers and treated activated carbon particles. Porous membranes, for example PTFE membranes, have relatively small pores, relatively high permeability, high chemical resistance, and relatively high mechanical strength.

Use of an expanded PTFE membrane greatly enhanced the performance of filter elements because the particles collect on the surface of the expanded PTFE, rather than in the depth of the textile filter layers as was occurring in the absence of the membrane layer. Several significant advantages may be obtained using a porous membrane on the first side 100a of the first textile 100. The filter 10 may last longer because particles do not get into the first textile 100. Additionally, for cleanable systems, the cleaning energy needed to clean the particle cakes off of the filter may be lower because the surface of the membrane 400 is smooth and has a lower surface energy than the first textile layer 100.

In one preferred embodiment, the porous membrane 400 is a porous expanded polytetrafluoroethylene (PTFE) membrane. The porous PTFE membranes useful in such elements are prepared by a number of different known processes, but are preferably prepared by expanding PTFE as described in U.S. Pat. Nos. 4,187,390, 4,110,392 and 3,953,566, to obtain expanded, porous PTFE. By "porous" is meant that the membrane has an air permeability of at least 2 cubic feet per minute per square foot ($cfm/ft^2$) at 0.5 inch water gauge (this unit is sometimes referred to as the Frazier number). Membranes having an air permeability of up to 300 $cfm/ft^2$ or more can also be used. The pores are micropores formed by the nodes and fibrils of the expanded PTFE. Preferred membranes of the present invention have an air permeability of at least 5, and more preferably at least 16, $cfm/ft^2$ at 0.5 inch water gauge, for use in gas stream filtration.

In another series of embodiments, the invention provides a process for producing treated activated carbon particles, such as the treated activated carbon particles described above in connection with the first and second embodiments. In general, the process entails providing a plurality of activated carbon particles, providing a hydrophobic agent, providing a mercury oxidation facilitation agent, and applying the hydrophobic agent and the mercury oxidation facilitation agent to at least a portion of the activated carbon particles. Within this general framework, the process can be adapted with regard to the order and/or manner in which the hydrophobic agent and mercury oxidation facilitation agent are applied to the activated carbon particles.

In a first embodiment of the process generally described above, the process comprises the steps of (a) providing a plurality of activated carbon particles (b) providing a hydrophobic agent, (c) providing a mercury oxidation facilitation agent, (d) applying the hydrophobic agent to at least a portion of the outer surface of at least a portion of the activated carbon particles, and (e) applying the mercury oxidation facilitation agent to at least a portion of the outer surface of at least a portion of the activated carbon particles.

In a second embodiment of the process generally described above, the process comprises the steps of (a) providing a plurality of activated carbon particles (b) providing a hydrophobic agent, (c) providing a mercury oxidation facilitation agent, (d) applying the mercury oxidation facilitation agent to at least a portion of the outer surface of at least a portion of the activated carbon particles, and (e) applying the hydrophobic agent to at least a portion of the outer surface of at least a portion of the activated carbon particles.

In a third embodiment of the process generally described above, the process comprises the steps of (a) providing a plurality of activated carbon particles, (b) providing a treatment composition, and (c) applying the treatment composition to at least a portion of the outer surface of at least a portion of the activated carbon particles. The treatment composition comprises (i) a hydrophobic agent and (ii) a mercury oxidation facilitation agent.

In each embodiment of the process described above, the activated carbon particles can be any suitable activated carbon particles, including any of the activated carbon particles described above in connection with the first and second embodiments. Also, the hydrophobic agent and the mercury oxidation facilitation agent can be any suitable hydrophobic agent and mercury oxidation facilitation agent, including those described above in connection with the first and second embodiments. Further, the hydrophobic agent and the mercury oxidation facilitation agent can be used in any suitable amounts, including those amounts described above in connection with the first and second embodiments.

The hydrophobic agent, the mercury oxidation facilitation agent, and the treatment composition can be applied to the activated carbon particles using any suitable technique. In order to facilitate application of these agents or the treatment composition, the hydrophobic agent, the mercury oxidation facilitation agent, and the treatment composition are typically provided in a liquid form. Utilizing a liquid form can facilitate handling of the agent and/or the composition and permits the agent and/or composition to be applied to the activated carbon particles by several techniques. For example, the hydrophobic agent, the mercury oxidation facilitation agent, and/or the treatment composition can be applied to the activated carbon particles by immersing at least a portion of the activated carbon particles in the agent and/or the composition. Alternatively, the hydrophobic agent, the mercury oxidation facilitation agent, and/or the treatment composition can be applied by spraying the agent and/or the composition onto the activated carbon particles. In such an application process, the agent and/or the treatment composition can be sprayed in the form of a simple liquid stream or the agent and/or the treatment composition can be sprayed in an atomized or aerosol form. Further, in such an application process, the activated carbon particles can be conveyed to the spray by any suitable means. For example, the activated carbon particles can be conveyed to the spray in a fluidized state, such as that produced by a fluidized bed. The activated carbon particles can also be placed into a drum which is rotated as the particles are sprayed. The fluidization and/or movement of the activated carbon particles produced by each of these techniques helps to more evenly apply the agent and/or the composition to the activated carbon particles.

Preferably, the agent and/or the treatment composition is applied in the form of a spray or aerosol of fine mist, which conditions are believed to provide a more uniform treatment of the activated carbon particles. The appropriate particle size of the spray or mist is believed to depend, at least in part, on the size of the activated carbon particles to be treated. Preferably, the particle size of the spray or mist is no larger than about 2 to about 5 times the size of the activated carbon particles to be treated. Thus, for an activated carbon particle having an average size of about 10 µm to about 50 µm, the average particle size of the spray or mist preferably is about 5 µm to about 200 µm or about 20 µm to about 100 µm.

It is believed that the activated carbon particles described above and the particles produced by the above-described process possess additional advantages beyond improved performance as a chemical adsorbent in industrial processes. The fly ash produced by the combustion of coal can be used as a filler or binder for concrete mixtures. However, it is generally known that untreated activated carbon can absorb some of the additives used in concrete mixtures, such as the air entrainment additive(s), which will negatively impact the desired properties of the concrete (e.g., negatively impact the freeze-thaw stability of the concrete). These deleterious effects have limited the use of activated carbon injection in those processes where the fly ash is intended to be sold for use in concrete. But it is believed that the activated carbon particles described above will absorb less of the additives (e.g., air entrainment additives) in the concrete mixture, thereby minimizing the negative effects normally associated with the use of activated carbon-containing fly ash. Thus, it is believed that the activated carbon particles described above will enable the wider use of activated carbon injection in conjunction with those processes where the resulting fly ash is intended to be sold for use in concrete.

The process for using the filter to reduce heavy metals in a flue gas comprises passing a flue gas having a temperature of at least 250° F. and containing heavy metals through the filter described above, where the gas exiting the filter has a lower elemental heavy metal content because at least at least a portion of the heavy metals are converted to halogenated metals and at least a portion of the heavy metals are adsorbed by the treated activated carbon particles. The heavy metal is preferably mercury. The textile may be manufactured in any known manufacturing method. The chemistry may be applied to the textile in known manner, preferably in a manner that retains a significant portion of the air permeability of the textile.

In one embodiment, the treated activated carbon particles are applied to the second side of the first textile by foam coating the chemistry. Any foaming processes and foam coating processes known to an ordinary skill in the art can be used. In an exemplary foam coating process, the adsorbent (usually in the form of particles or water suspension), the halogen producing agent, a binder (typically in the form of a latex emulsion or dispersion) and other optionally components such as foaming agent and rheology modifiers are combined and agitated with injection of air to produce a mixture having fine air bobbles embedded relatively uniformly throughout the mixture. The density of the mixture is typically used to estimate and monitor the amount of injected air. The foaming mixture usually has a density between 0.02 g/cm$^3$ to about 0.8 g/cm$^3$, preferably, 0.1 g/cm$^3$ to 0.4 g/cm$^3$. The foaming mixture is applied to the textile substrate through coating, extrusion, or other known process known to one of ordinary skills. After application, the foaming mixture is dried, preferably at elevated temperatures to remove water and entrapped air. The foamed coating allows the inclusion of sufficient amount of treated activated carbon particles without significant reduction in air permeability. In one embodiment, the chemistry is used with a viscosity capable of trapping many air bubbles within it creating foam, the chemistry is then laid onto the material and knife or blade is used to allow only the desired quantity of material to pass into the curing oven. When the chemistry cures the entrapped air becomes voids aiding in the permeability of the material.

In one embodiment, a coal based activated carbon powder with a particle size ranging from about 1 micron to about 100 microns may be suspended in water in the presence of a polyacrylic acid and a sulfonated alkylaromatic surfactant under mechanical stirring. A suspension with 20% to 40% solid content can be prepared in this manner. The activated carbon suspension may be then combined with, and optionally with a thickening agent or a foaming agent (such as ammonium stearate and amine oxide surfactants). The mixture is then whipped inside a container to foamed an air bubble entrained foamed mixture, or processed through a foaming apparatus (foamer) to provide a foamed mixture. The mixture is subsequently applied to a surface of a textile layer by coating, spray, or extrusion. The textile with foamed mixture is then dried at elevated temperature to remove the entrained air and water for a filter medium.

In one embodiment, the first side 100a of the first textile 100 (which typically forms the outermost surface of the filter) is singed. This means that the outer surface is exposed to an open flame so that small fibers are removed by temperature and flame on the first side of textile 100. This leaves a slightly rough feeling surface on the textile absent of small fibers on the first side of textile 100; thus allowing the filter to release the dust cake more easily upon reverse pulse cleaning.

In one preferred embodiment a filter 10 is constructed as a bag using textile 100. Textile 100 is sewn or ultrasonically welded into a bag so that the first side (without the treated activated carbon particles) is exposed on the outside of the bag. Filter 10 is usually constructed of a length of between 4 and 20 ft, and between 4 and 36 inches in diameter. Multiple bags are then assembled into a bag house. The bags are situated so that upon reverse pulse cleaning the released dust cake can be easily collected. The number of bags in the bag house is set to allow the desired volume of air to be cleaned in the bag house. Often times many bag houses will be required to treat the large amount of flue gas generated in large power facilities. Typically the dirty air will enter into a bag house containing a multitude of between 12 and 98 (>10,000) bags. The air will be pulled into the hanging bags and clean air will be pulled out the top of the bag house from inside of the bags.

The following examples further illustrate the subject matter described above but, of course, should not be construed as in any way limiting the scope thereof.

EXAMPLES

Example 1

A foamed mixture was formed by blending,
40 grams of RF264-C, a 40% solid activated carbon fine powder dispersion from Apexical,
2 grams Daikin Unidyne TG 5601, a fluorocarbon repellent emulsion,
5 grams NaBr
38 grams of Polon MF-56, a silicone resin emulsion from Shin-Etsu, as a binder and a hydrophobic agent
3 grams of Unifroth 529, a foaming agent and
15 grams, deionized water The foamed mixture was scrape-coated on one side of a 100% PPS (polyphenylene sulfide) nonwoven and a 100% PET (polyester) nonwoven, which were each then dried in a convection oven at about 320° F. The silicone polymer served as a binder, a heat protective coating for the PET and PPS fibers, and a repellent against condensation of exhaust contaminants such as water, $SO_3$ or sulfuric acid, to allow the activated carbon to be free of liquid condensation and to allow maximal chance for it to adsorb mercury and organic contaminants. A propane lighter was used to test the propensity of the nonwoven to be melt and burned through. Without coating, the nonwoven was burned through in a few seconds. It was clearly visible that the PPS and PET fibers melted and a hole was created by the flame. When the same flame was exposed to the coated side of each nonwoven (PPS and PET), no surface melting was observed. In fact, the PPS fiber on the non-coated side (without coating, but not directly exposed to flame) melted while the coated side was still intact. The coated side of the nonwoven can withstand impingement of hot particles and sparks without incurring any damage to the filter, which cannot be achieved using a PPS and PET textile without a coating.

The coated fabric described above could be used a bag house filter fabric, or be used as an additional layer on top of a bag house filter fabric. The coated fabric can be replaced when the adsorption capacity of the activated carbon in the fabric diminishes after being used to adsorb mercury for a period of time.

Example #2

Prophetic

The formulation described in example 1 can be used to coat or impregnate a knit fabric to form a treated knit fabric. The fabric can be made into a stretchable tube or other structure which can be easily fitted over an existing filter bag or pleated filter. The knit fabric can also be easily removed from the exist filter. In a reverse air filter bag configuration, for example, the knit tube can be fitted on the outside an existing glass fiber filter bag, to provide mercury adsorption capability. Since the dust particles and cake typically are captured inside the bag, the knit fabric tube is protected from dust buildup. The knit fabric tube can also be easily removed after use.

The knit fabric substrate can be made from any fiber or fiber blends depending on the specific end use environments. For example, polyester, PPS, aramid, polyoxadiazole, FR rayon, glass fiber and any blends thereof, may be used to construct the knit fabric.

Example #3

Prophetic

Similar to Example 2, a woven or nonwoven fabric can be impregnated with the coating described in example #1. The treated woven or nonwoven fabric can be stitch bonded or laminated to a conventional filter medium to provide mercury adsorption capability. The fabric can also be used as a separate liner layer, an insert, or a sleeve in a filtration apparatus. In another embodiment, the treated filtration medium may be used synergistically in combination with the ACI process, where the activated carbon used in ACI is preferably brominated. The bromine agent used with the activated carbon may be further captured or adsorbed on the filtration medium to further improve the efficiency of mercury oxidation. The filtration medium can be further laminated with a filtration membrane such as expanded PTFE member. Treatment of the membrane with at least one of the above treatment composition is also conceived. Used filter of the invention may be further treated or washed to remove hazardous mercury containing chemicals before disposed. The treatment or wash procedure may include hot caustic wash, hot acid wash, solvent extraction, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A filter comprising a first textile having a first side and a second side, wherein the first textile is selected from the group consisting of a non-woven, woven, and knit, and wherein the first textile has an air permeability of between about 1 and 200 cfm; and wherein at least one side of the first textile comprises treated activated carbon particles, wherein the treated activated carbon particles comprise:
   (a) a plurality of activated carbon particles, the activated carbon particles having an outer surface;
   (b) a hydrophobic agent selected from the group consisting of film-forming fluorocarbon polymers, silicones, alkylsilanes, waxes, and mixtures thereof, at least a portion of the hydrophobic agent being disposed on at least a portion of the outer surface of the activated carbon core;
   (c) a mercury oxidation facilitation agent; and,
   (d) optionally a binder.

2. The filter of claim 1, wherein the second side of the first textile comprises the treated activated carbon particles.

3. The filter of claim 1, wherein the treated activated carbon particles comprise a binder being disposed on at least a portion of the outer surface of at least a portion of the activated carbon particles.

4. The filter of claim 1, wherein the hydrophobic agent is a film-forming fluorocarbon polymer comprising repeating units derived from a monomer selected from the group consisting of fluorinated acrylate monomers, fluorinated acrylamide monomers, fluorinated ethylenic monomers, fluorinated polyols, fluorinated polyisocyanates, and mixtures thereof.

5. The filter of claim 1, wherein at least a portion of the mercury oxidation facilitation agent is disposed on at least a portion of the outer surface of the activated carbon core.

6. The filter of claim 1, wherein the mercury oxidation facilitation agent is selected from the group consisting of chlorinated aliphatic compounds, brominated aliphatic compounds, and mixtures thereof.

7. The filter of claim 1, wherein the mercury oxidation facilitation agent is present in an amount of about 1% to about 10% based on the weight of the activated carbon core.

8. The filter of claim 1, wherein the first textile comprises fibers selected from the group consisting of glass, aramid, polyphenylene sulfide, polyester, polyimide, polytetrafluoroethylene, ceramic materials, sulfo-aramid, polyoxadiazoles and polyetheretherketone.

9. The filter of claim 1, wherein the filter further comprises an expanded polytetrafluoroethylene membrane on the first side of the first textile.

10. The filter of claim 1, wherein the filter further comprises a second textile located on the treated activated carbon particles, on the side of the treated activated carbon particles to the first textile and wherein the second textile comprises activated carbon fibers and wherein at least a portion of the organic mercury oxidation facilitation agent is disposed on the activated carbon fibers.

11. A bag house comprising a plurality of filters of claim 1.

* * * * *